US007174533B2

(12) United States Patent
Boucher (10) Patent No.: US 7,174,533 B2
(45) Date of Patent: Feb. 6, 2007

(54) METHOD, SYSTEM, AND PROGRAM FOR TRANSLATING A CLASS SCHEMA IN A SOURCE LANGUAGE TO A TARGET LANGUAGE

(75) Inventor: Jordan T. Boucher, Broomfield, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 462 days.

(21) Appl. No.: 10/098,945

(22) Filed: Mar. 14, 2002

(65) Prior Publication Data

US 2003/0188293 A1  Oct. 2, 2003

(51) Int. Cl.
*G06F 9/44* (2006.01)
(52) U.S. Cl. ...................... 717/104; 717/114
(58) Field of Classification Search ........ 717/168–178, 717/104, 114; 709/223, 104, 310; 707/3, 707/100, 243
See application file for complete search history.

(56) References Cited

U.S. PATENT DOCUMENTS

| | | | | |
|---|---|---|---|---|
| 6,289,501 | B1* | 9/2001 | Mutschler, III | 717/114 |
| 6,292,932 | B1* | 9/2001 | Baisley et al. | 717/114 |
| 6,317,748 | B1* | 11/2001 | Menzies et al. | 707/103 X |
| 6,341,372 | B1* | 1/2002 | Datig | 717/136 |
| 6,374,252 | B1* | 4/2002 | Althoff et al. | 707/102 |
| 6,529,909 | B1* | 3/2003 | Bowman-Amuah | 707/10 |
| 6,550,054 | B1* | 4/2003 | Stefaniak | 717/104 |
| 6,560,769 | B1* | 5/2003 | Moore et al. | 717/100 |
| 6,711,734 | B1* | 3/2004 | Baisley | 717/104 |
| 6,742,175 | B1* | 5/2004 | Brassard | 717/107 |
| 6,804,686 | B1* | 10/2004 | Stone et al. | 707/104.1 |
| 2003/0095145 | A1* | 5/2003 | Patrizio et al. | 345/764 |
| 2003/0115197 | A1* | 6/2003 | Horan et al. | 707/6 |
| 2003/0135657 | A1* | 7/2003 | Barker et al. | 709/310 |
| 2003/0140055 | A1* | 7/2003 | Doney et al. | 707/101 |

OTHER PUBLICATIONS

Distributed Management Task Force, Inc. "CIM Tutorial: CIM Concepts", [online], 2002, [Retrieved on Jan. 9, 2002], Retrieved from the Internet at <URL: http://www.dmtf.org/education/cimtutorial/using/conc.php> (*Clean copy Reprint Dated Feb. 14, 2003*).

(Continued)

*Primary Examiner*—Tuan Dam
*Assistant Examiner*—Isaac Tecklu
(74) *Attorney, Agent, or Firm*—Dorsey & Whitney LLP (57) ABSTRACT

Provided are a computer implemented method, system, and program for translating a class schema in a source language to a target language. Class element definitions in a source file in the source language are received. The definitions of the class elements define instances of metadata types providing metadata for the class elements. Statements in the target language are generated to implement class elements defined in the source file. Statements are generated in the target language to define metadata elements for metadata types. For each metadata data type instance defined with one class element in the source file, at least one statement is generated in the target language to associate the metadata element generated for the metadata type with the implementation of the class element corresponding to the class element defined with the metadata type instance in the source file.

42 Claims, 8 Drawing Sheets

OTHER PUBLICATIONS

Distributed Management Task Force, Inc. "CIM Tutorial: Specifying Schema", [online], 2002, [Retrieved on Jan. 9, 2002], Retrieved from the Internet at <URL: http://www.dmtf.org/education/cimtutorial/extend/spec.php> (*Clean copy Reprint Dated Feb. 14, 2003*).

Distributed Management Task Force, Inc. "Common Information Model (CIM) Specification", Version 2.2, Jun. 14, 1999. pp. 1-98.

Distributed Management Task Force, Inc. "XML As a Representation for Management Information—A White Paper", Version 1.0, [online] Sep. 15, 1998, [Retrieved on Feb. 27, 2002], Retrieved from the Internet at <URL: http://www.dmtf.org/standards/xmlw.php>.

DMTF System and Devices Working Group. "Core MOF specification 2.6", Version 2.6, © 2001 Distributed Management Task Force, Inc. (DMTF), Jun. 12, 2001.

Object Management Group (OMG), Inc. "OMG Unified Modeling Language Specification", Version 1.3, Jun. 1999. pp. 1 through 1-16.

Object Management Group (OMG), Inc. "OMG XML Metadata Interchange (XMI) Specification", Version 1.1, Nov. 2000, pp. 1 through 1-12.

Sridhar, Iyengar and Steve Brodsky. "Metadata Integration using UML, MOF and XMI", *Object Modeling with OMG UML Tutorial Series*, Nov. 2000. pp. 1-88.

\* cited by examiner

METHOD, SYSTEM, AND PROGRAM FOR TRANSLATING A CLASS SCHEMA IN A SOURCE LANGUAGE TO A TARGET LANGUAGE

BACKGROUND OF THE INVENTION

1. Field of the Invention

The present invention relates to a method, system, and program for translating a class schema in a source language to a target language.

2. Description of the Related Art

The Common Information Model (CIM) provides a conceptual framework for interchanging information between management systems and applications. The CIM schema provides a set of object oriented classes with properties that are used to organize and access the information about the managed environment in a common format. The managed environment may include systems, applications, networks, and devices. Extension schemas are provided to extend the CIM to technology-specific areas, such as storage devices. To be CIM compliant, a product must implement the CIM core and common schema classes so that the CIM methods can be used to access information about the product. This requires the product vendor to develop product (e.g., application, device, system, etc.) specific code that implements the CIM classes to provide access to the product information.

Vendors that want to write programs to participate in a CIM environment use the Managed Object Format (MOF) computer language. MOF is a compiled language created by the Distributed Management Task Force (DMTF) and based on the Interface Definition Language (IDL). The MOF language is used to define static or dynamic classes and instances. Classes and instances are defined using ASCII or Unicode text and placed in a file that is submitted to a MOF compiler. The MOF compiler parses the file and adds the classes and instances defined in the file to the CIM Object Manager repository, which contains the definitions of classes and instances that represent managed objects and their relationships. In coding a MOF file, the developer may initially create a visual representation of a schema using the Microsoft Corporation Visio** program and then manually code a MOF file based on the Visio representation of the schema.

**Microsoft and Visio are trademarks of the Microsoft Corporation; and UML is a trademark of the Open Management Group, Inc.

Although developers may need to code their schemas in MOF to participate in the CIM environment, in many cases developers may still want to convert the MOF file into a Universal Modeling Language (UML)** file because of the abundance of software development tools available to manipulate UML representations of a schema.

**Microsoft and Visio are trademarks of the Microsoft Corporation; and UML is a trademark of the Open Management Group, Inc.

For these reasons, there is a need in the art to provide tools that allow for mapping of schemas between modeling languages, such as MOF and UML.

SUMMARY OF THE DESCRIBED IMPLEMENTATIONS

Provided are a computer implemented method, system, and program for translating a class schema in a source language to a target language. Class element definitions in a source file in the source language are received. The definitions of the class elements define instances of metadata types providing metadata for the class elements. Statements in the target language are generated to implement class elements defined in the source file. Statements are generated in the target language to define metadata elements for metadata types. For each metadata data type instance defined with one class element in the source file, at least one statement is generated in the target language to associate the metadata element generated for the metadata type with the implementation of the class element corresponding to the class element defined with the metadata type instance in the source file.

In further implementations, statements are generated to provide content with the association of the metadata element and the implementation of the class element in the target language when the instance of the metadata type for the class element in the source file provides content.

Yet further, in certain implementations, the source file defines instances of metadata types for classes, methods, properties, and method parameters. In such implementations, the association of the metadata element with the implementation of the classes, method, properties, and method parameters associates the metadata element with the implementation of the class including the class, method, property, and method parameter defined with the metadata type in the source file.

In still further implementations, generating the statements to define metadata elements for metadata types further comprises generating statements in the target language to define attribute elements for attributes defined with the metadata types in the source file. For each metadata type in the source file defined with attributes, statements in the target language are generated to associate the metadata element generated for the metadata type with the attribute elements corresponding to the attributes defined for the metadata type in the source file.

The described implementations provide techniques for mapping a class schema in a source language to a schema in a target language in a manner that preserves metadata defined with the schema in the source language. Such implementations may be utilized in situations when the target language does not provide specific mappings for the metadata types provided in the source language. The described implementations provide techniques for using certain elements of the target language to implement the metadata from the source language.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

The described implementations are concerned with providing a mapping between different computer object oriented languages, such as MOF and UML. One challenge in providing a mapping from MOF to UML is to incorporate the metadata information included in a MOF file into the target UML model. Current implementations of the UML file do not provide structures for the different metadata types included in a MOF file. The described implementations provide techniques for including the MOF metadata when converting the MOF file to a UML model.

Elements of a MOF file that may be mapped to the UML model include:

MOF Comments: Comments can appear anywhere in the MOF file and include information on the schema, but are not included in the compiled target code of the MOF file.

MOF Compiler Directives: The compiler directives may include important information that is used by a MOF compiler and could be useful to developers when determining the requirements of the schema.

MOF Qualifier Blocks: MOF qualifier blocks comprise an optional list of qualifiers for a model element to associate with a class, association, indication, instance, property reference, method or parameter. MOF qualifier blocks comprise the metadata.

MOF Class, Property Reference, Method, Parameter, Instance: The MOF class, property, reference, method, parameter, and instance statements are used to define such elements in the schema. Each of these types of statements include the name of the element and may include a list of qualifiers providing metadata for the element. These elements, excluding their metadata, would map directly to UML statements for the same, except for the element metadata, which is mapped separately as described herein.

MOF Qualifier Types: These types are used to provide metadata for an element.

A qualifier may specify values for a flavor and/or scope of the qualifier type. Following are various attribute and scope metadata that may be defined in the MOF file.

Flavor Attribute: The flavor attribute for MOF qualifier types may specify one or more of the following flavor values:

DisableOverride: The qualifier cannot be overridden.
ToSubclass: The qualifier is inherited by any subclass.
Restricted: The qualifier applies only to the class in which it is declared.
Translatable: Indicates that the value of the qualifier can be specified in multiple locales (language and country combination). When "Translatable" is specified for a qualifier, the qualifier information may specify a language and/or region code.

Scope Attribute: The scope value for a MOF qualifier type element may specify one or more scope values, indicating with which schema elements the qualifier can be used. If there is no specified scope value, then there is no restriction on the scope of the qualifier. MOF scope attributes may including the following metadata:

Schema: is an abstraction or group of classes modeling a real world entity; all class names are unique within a schema.

Class: class is a collection or set of objects that have similar properties and fulfill similar purposes. Classes can contain properties, which describe the data of the class, and methods, which describe the behavior of the class.

Association: An association is a class that contains two or more references. It represents a relationship between two or more objects. An association is a type of class. Associations are classes with an association qualifier.

Reference is a property type that is declared with the REF key word, that the element is a pointer to other instances. A reference defines the role each object plays in an association. The reference represents the role name of a class in the context of an association. Associations support the provision of multiple relationship instances for a given object.

Qualifier: qualifier is used to characterize classes, properties, and other elements of the schema (for example, qualifiers can define a required property or the key of a class). Qualifiers provide a mechanism that makes the schema definition language extensible in a limited and controlled fashion.

Indication: an object created as a result of the occurrence of an event, such as a database trigger. Indications can have properties and methods, and can be arranged in a type hierarchy.

Method an operation describing the behavior of a class. Not all classes have methods.

Property: a value used to characterize data of a class.

Parameter: an input passed to a method to use during execution of the method or an output returned by the method.

The UML provides notation elements to represent the schema. The elements that may be modeled in the UML include:

class: a statement that defines an object oriented class.
object: defines an instance of some class.
generalization: describes a subtype or child class to a supertype parent class relationship.
association: defines a class to class relationship, such as aggregation or
composition: An association may be unidirectional, bidirectional or non-directional (when the association is defined by and contained within a third class.
dependency: defines a relationship between two or more elements, e.g., class A depends on class B for its implementations.
note: element that captures information the developer provides.

Further details of the MOF are described in the publication "Common Information Model (CIM) Specification", published by the Distributed Management Task Force (DMTF) Version 2.2 (Jun. 14, 1999) and details of the UML are described in the publication "OMG Unified Modeling Language Specification", Version 1.3, published by the Object Management Group, Inc. (June 1999), which publications are incorporated herein by reference in their entirety.

The described implementations provide techniques for mapping the elements of a MOF file into elements within the UML model. A UML model may be readily converted to an Extensible Markup Language (XML) Metadata Interchange (XMI) file in a manner known in the art. Thus, in describing a mapping from the MOF schema to the UML model, the coding of the UML model as an XMI file can be readily performed with software tools known in the art. Alternatively, the UML models described herein can be coded in alternative formats in manners known in the art. The mapping must take into account the mapping of MOF primitive types, qualifier flavor and qualifier scope to the UML model because the UML model does not specifically provide for such elements.

Figure 1:
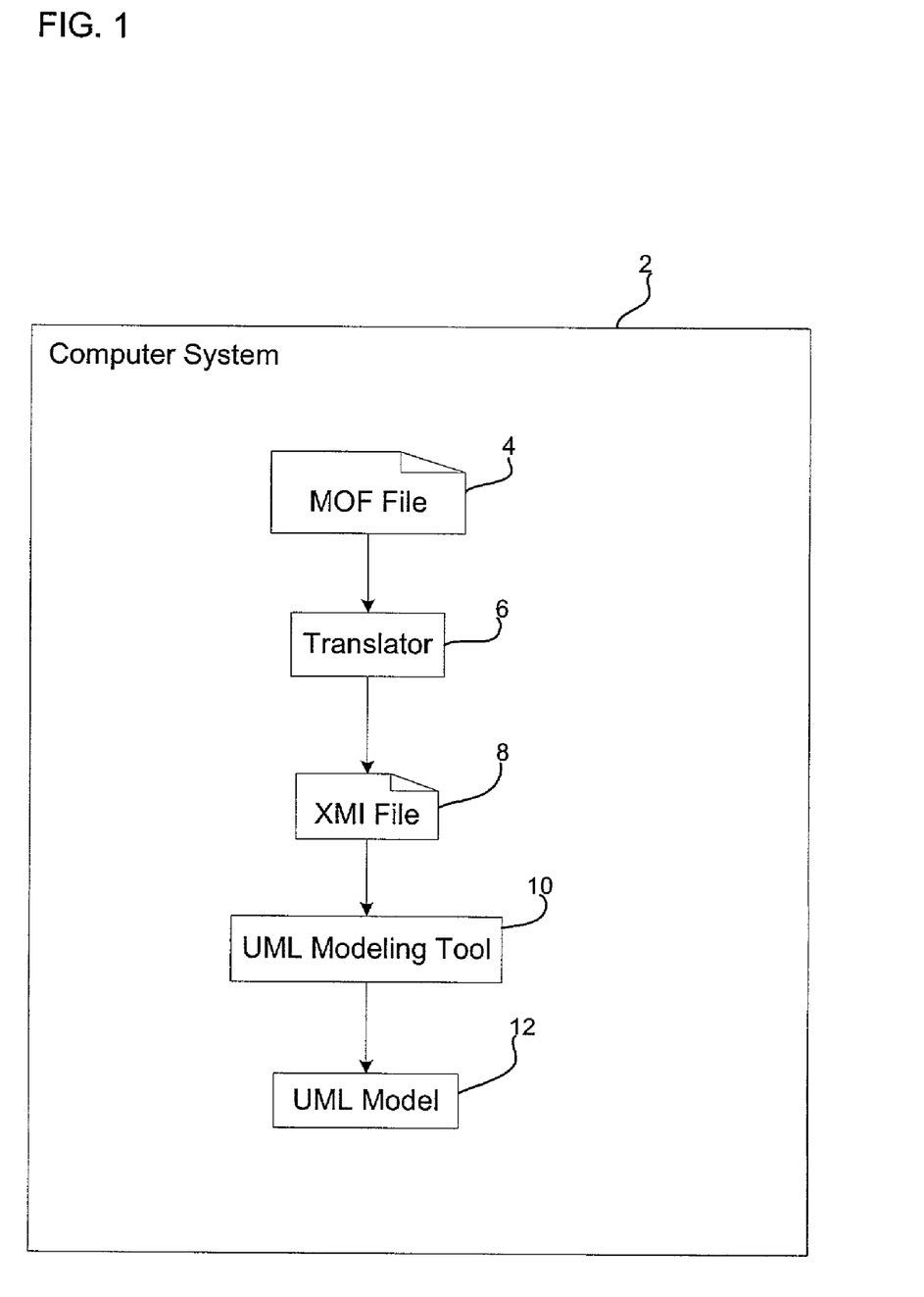
FIG. 1 illustrates a computing environment in which aspects of the invention are implemented.

FIG. 1 illustrates a computing environment in which aspects of the invention may be implemented. A computer system 2 includes a MOF file 4 including a schema defined pursuant to the MOF specification. A translator 6 maps the statements in the MOF file 4 into a file format, such as an XMI file 8 (or any other file format capable of implementing a UML model) in a manner known in the art. A UML modeling tool 10, such as UML modeling tools known in the art, may then further transform the XMI file 8 into a UML model 12 in a native format known in the art. The UML modeling tool 10 may further manipulate or modify the UML model 12 generated from the XMI file 8. In FIG. 1, the translator 6 is shown as a separate component from the UML modeling tool 10. In further implementations, the translator 6 may be packaged with the UML modeling tool 10 to provide added functionality to the UML modeling tool 10. The computer system 2 may comprise any computational device known in the art having sufficient computational resources to run software development tools, such as a personal computer, workstation, mainframe, etc.

Figure 2:
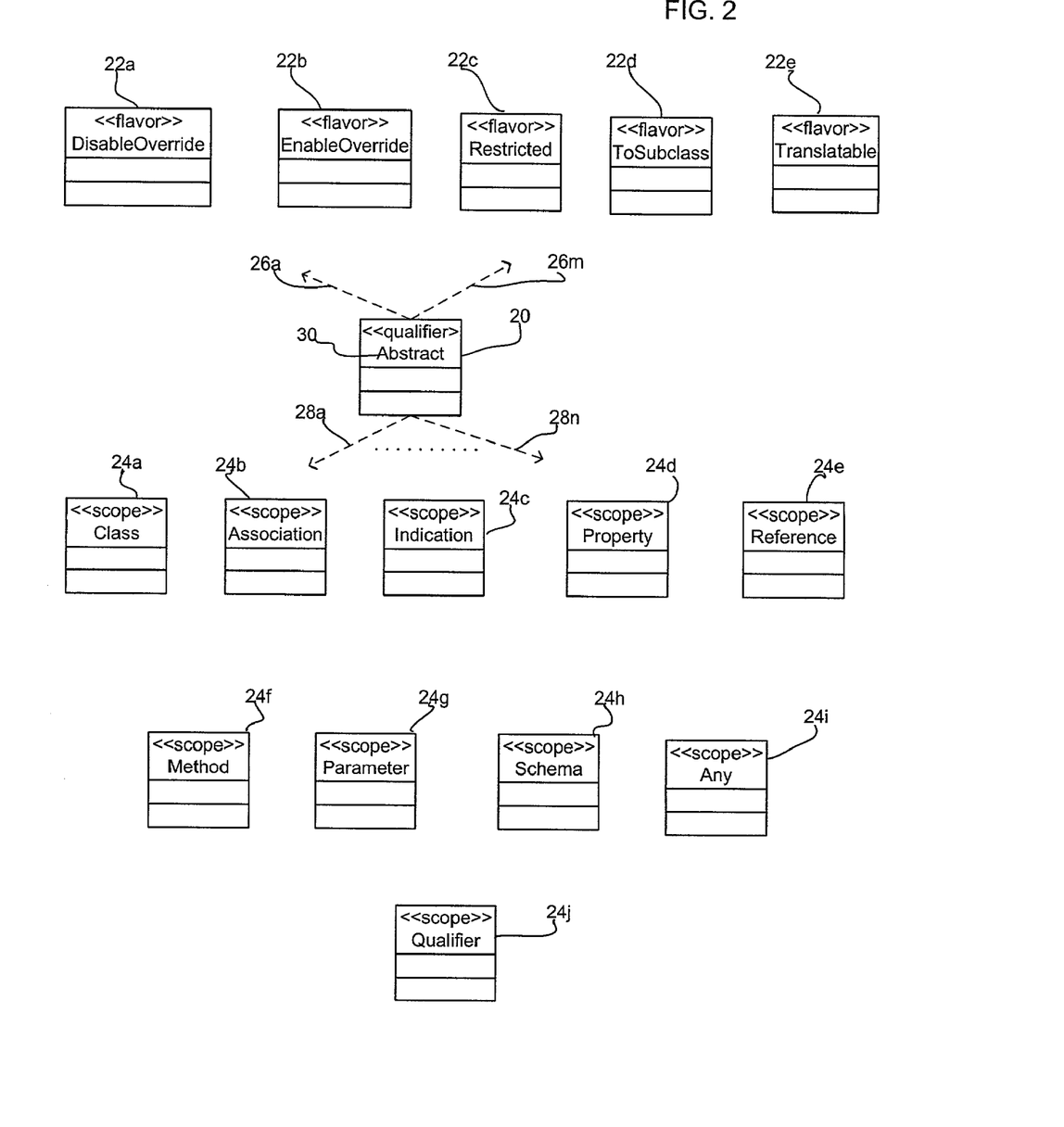
FIGS. 2, 3, and 4 illustrate how elements in a source language are mapped to elements in a target language to preserve metadata in accordance with implementations of the invention.

In certain implementations, the translator 6 will implement all possible flavors and scope values defined in the MOF specification to UML stereotyped classes. In UML, the stereotyped element is used to extend the capabilities of the metadata model to allow the user to provide new types of information. To define a specific qualifier type in the MOF that is defined to have specific scope and flavor values, the translator 6 may define a stereotyped class for the qualifier and then provide dependency links from the stereotyped class defined for the qualifier to the UML stereotyped classes defined for the scope and flavor values. FIG. 2 illustrates how the translator 6 may map a qualifier type defined in the MOF file 4 to a qualifier stereotyped class 20, which in FIG. 2 is shown as the abstract qualifier type 20. FIG. 2 illustrates each of the possible flavor 22a, 22b . . . 22e and scope 24a, 24b . . . 24j values defined in the MOF specification. For each of the scope and/or flavor values defined for a qualifier type in the MOF file 4, the translator 6 would define in the UML model 12 one or more dependency links 26a . . . 26m and/or 28a . . . 28n from the defined qualifier type stereotyped class 20 to one or more of the flavor 22a, 22b . . . 22e and/or scope 24a, 24b . . . 24j values corresponding to the flavor and/or scope value(s) defined for the specific qualifier type instance in the MOF file 4. In UML, a dependency link specifies a "using" relationship to indicate that the change in specification of one class may change the other class that uses such class. A qualifier type stereotyped class may be defined for any qualifier type defined in the MOF file 4, such as the standard qualifier types defined in the MOF specification. The name of the qualifier type instance may be specified in the name portion of the defined qualifier type stereotyped class, as shown by the "Abstract" name 30 in the qualifier stereotyped class 20 shown in FIG. 2.

Figure 3:
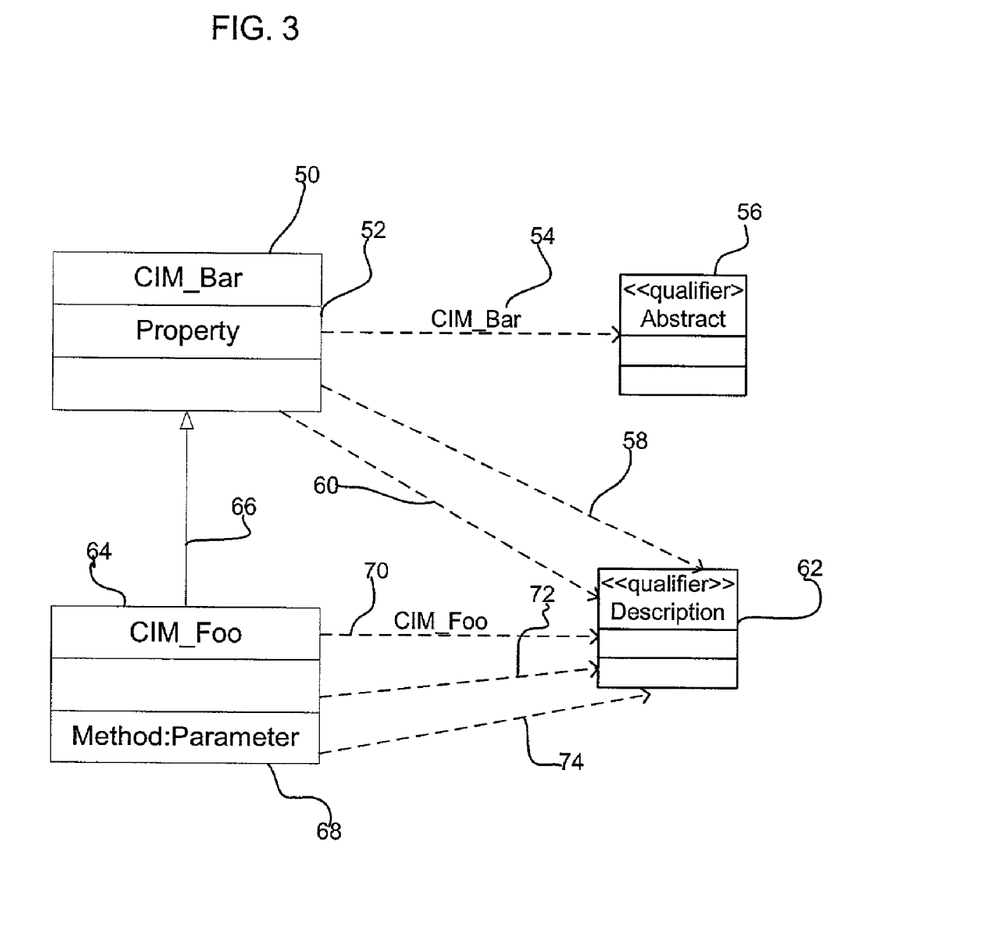

The translator 6 may map classes and methods and properties defined for a class in the MOF file 4 directly to the corresponding UML class, method and property elements. To the extent qualifier types are defined for a class, property, method or method parameter in a MOF file, the translator 6 would generate a dependency link from the class for which the qualifier type is defined to the UML qualifier type stereotyped class created for the qualifier type. FIG. 3 illustrates how the translator 6 would map a class defined in the MOF file 4, including any properties and methods defined for the class, as well as any qualifier types defined for the class, properties, methods or method parameters, to the UML model 12. The classes, properties, methods and method parameters defined in the MOF file 6 would map directly to the UML model structures for class, properties, methods, and method parameters. Thus, with respect to FIG. 3, a defined class CIM_Bar having properties, simply shown as "Properties", would map to a UML CIM_Bar class 50 having a defined property 52. If the MOF file 4 defines the CIM_Bar class as having an abstract and description qualifier type, then the translator 6 would generate, as shown in FIG. 3, a UML dependency link 54 for the UML class $CIM_{13}$ Bar 50 to the stereotyped class 56 generated for the abstract qualifier type defined in the MOF file 4. In certain implementations, the translator 6 would name the dependency link the name of the element that is subject to the link, which in the case of dependency link 54 is the CIM_Bar class 50.

In the example of FIG. 3, the MOF file 4 would have further defined a description qualifier type for both the CIM_Bar class and its property. In such case, the translator 6 would generate dependency links 58 and 60 named for the CIM_Bar class and Property 52, respectively, to the description qualifier 62 stereotyped class generated for the MOF description qualifier type to represent that MOF description qualifier metadata. Note that the dependency link takes on the specific name of the element, such as the class or property name. A MOF file 4 may provide content or values for certain qualifier types, such as description. For those qualifier types having separate content that may differ for different qualifier type instances, the translator 6 would include the content/values with the dependency link for the specific element. Thus, the CIM_Bar 58 and property 60 dependency links to the description qualifier stereotyped class 62 would include any description the MOF file 4 provided for the CIM_Bar and property description qualifiers, respectively.

FIG. 3 further illustrates how the UML model 12 represents a CIM_Foo class 64 that has an inheritance relationship 66 to the CIM_Bar class 66 and a method 68 having a parameter. The MOF file 4 would have defined separate qualifier type instances for the represented CIM_Foo class and its method and parameter. In such case, the translator 6 would generate separate UML dependency links 70, 72, and 74 to the description qualifier stereotyped class 62 for the CIM_Foo class 64, method 66, and method parameter 68, respectively. Each dependency link 70, 72, and 74 would include any content the MOF file 4 defined for the description qualifiers for the CIM_Foo class and its method and parameter. Each dependency link name 70, 72, and 74 would include the particular name of the class element, e.g., class, method, property, method parameter, etc.

With the described implementations, the translator 6 implements the qualifier metadata defined in the MOF file 4 into the XMI file 8 used by the UML model 12 by generating stereotyped classes for each qualifier type and then providing dependency links from the class whose elements (class, method, parameters, properties) have qualifier type instances defined in the MOF file 4. The dependency links provide any specific content the MOF file 4 defines for the qualifier type, such as description content. Further, the UML modeling tool 10 can generate specific icons for the defined qualifier and the associated flavor and scope stereotyped classes to allow manipulation of the icons representing such qualifier information in a visual representation of the UML model 12.

Figure 4:
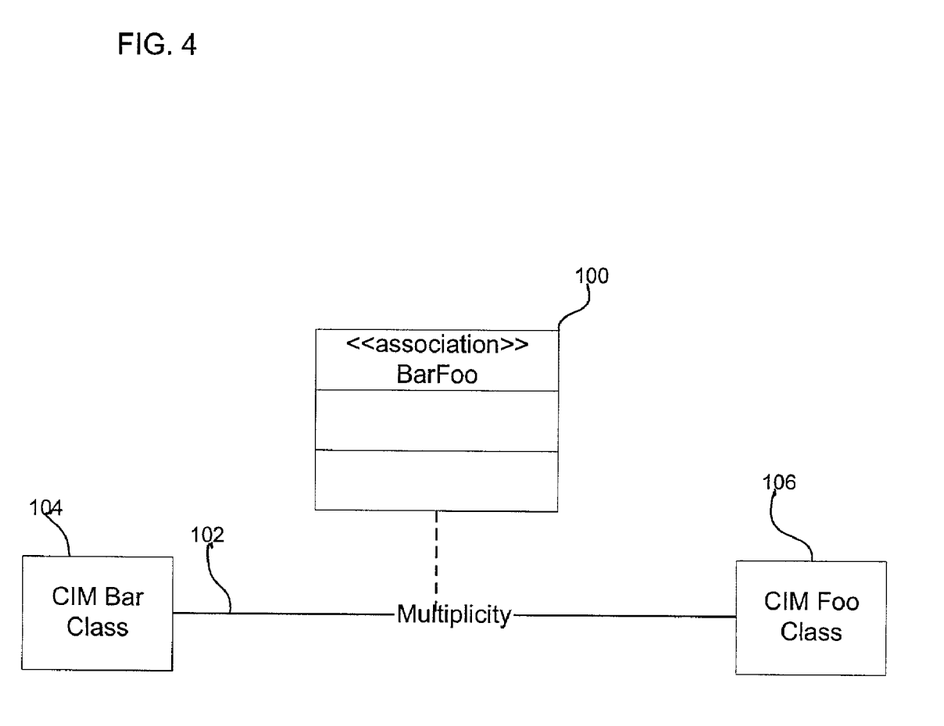

FIG. 4 illustrates how the translator 6 may generate and reference UML structures for a MOF association. Associations between classes in MOF are defined using an association qualifier type that provides information on the association, such as whether the class association has multiplicity, is an aggregation, etc. The translator 6 would initially generate an association stereotyped class 100 for the specific qualifier association defined in the MOF file 4 and then generate a UML association link 102 to associate the two classes CIM_Bar 106 and CIM_Foo 108 to the association defined in the MOF file 4 with the association qualifier type. The qualifier would identify the type of association, "<<aggregation>>", "<<association>>", etc. and have a name specifying the classes involved in the specification, such as a concatenation of the class names, e.g., "BarFoo". The translator 6 could add additional UML association information to the UML model 12, such as multiplicity, the direction of the relationship, roles that classes represent to each other within the association, based on the association information included with the association qualifier metadata in the MOF file 4. Details on the association may be added to the link 102, such as shown.

The MOF file 4 would also utilize MOF primitives to provide data type information for the property data types, such as string, integer, character, etc. MOF primitive data types would map to the data types provided in the UML Foundation Package that can be referenced in the UML model 12.

Figure 5:
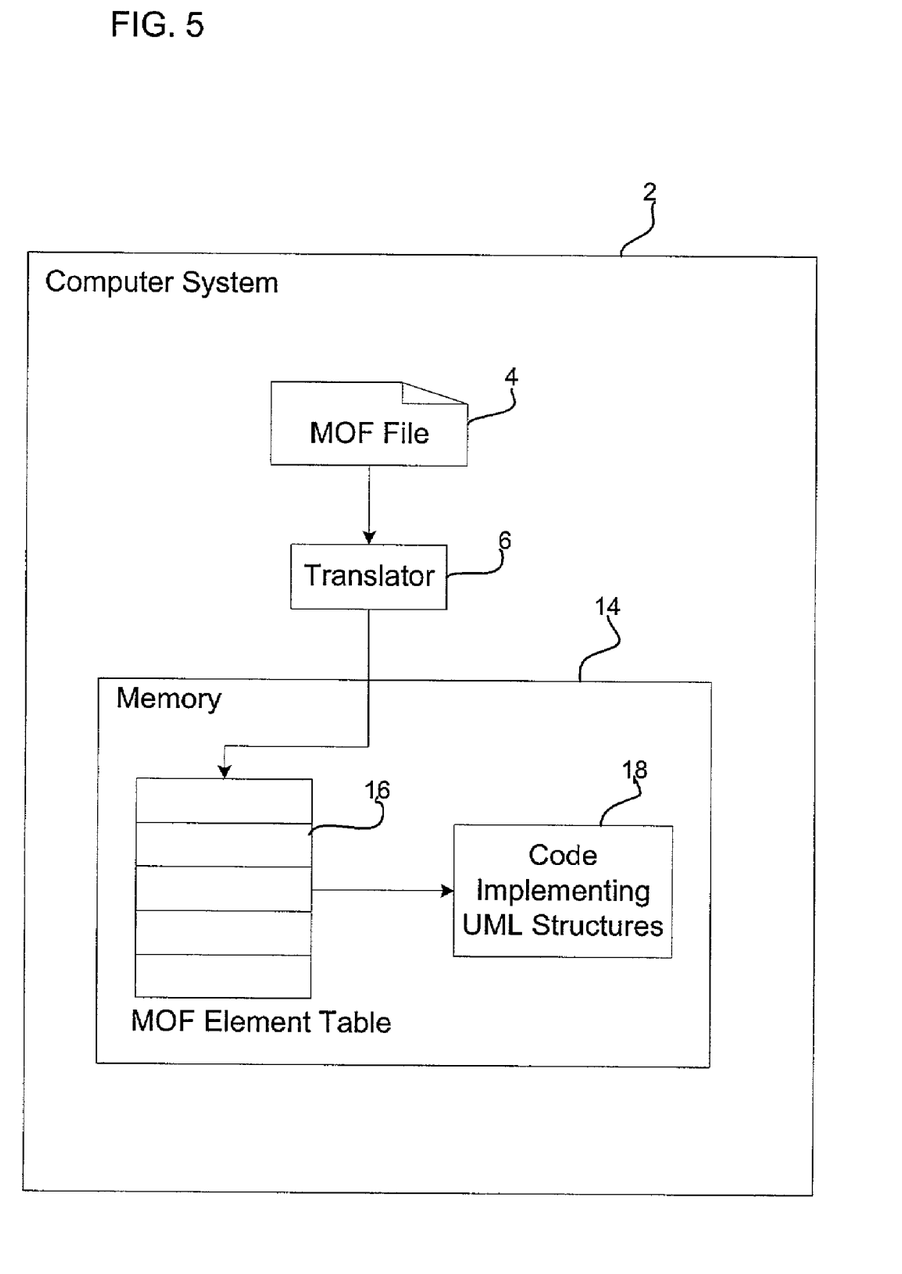
FIG. 5 illustrates further details of the computing environment of FIG. 1 to translate the source language to target language.

FIG. 5 illustrates further details of the computer system 2 shown in FIG. 1 relevant to the operations performed by the translator 6. The translator 6 would scan and process the elements defined in the MOF file 4, such as each class, method, property, qualifier, etc. and then generate into a memory 14, such as a high speed volatile memory, of the computer system, a MOF element table 16 including an entry for each MOF element that provides information needed to generate a corresponding UML structure for the MOF element. After constructing the table 16, the translator 6 would then convert the table 16 into code 18 implementing the UML structures. In certain implementations, the code 18 may comprise XMI coding of the elements or any other format capable of being imported by a UML modeling tool 10 to display a visual representation of the schema as a UML model 12, and allow the developer to manipulate the schema as a UML schema in a graphical user interface (GUI) environment generated by the UML modeling tool 10 in a manner known in the art.

Figure 6A:
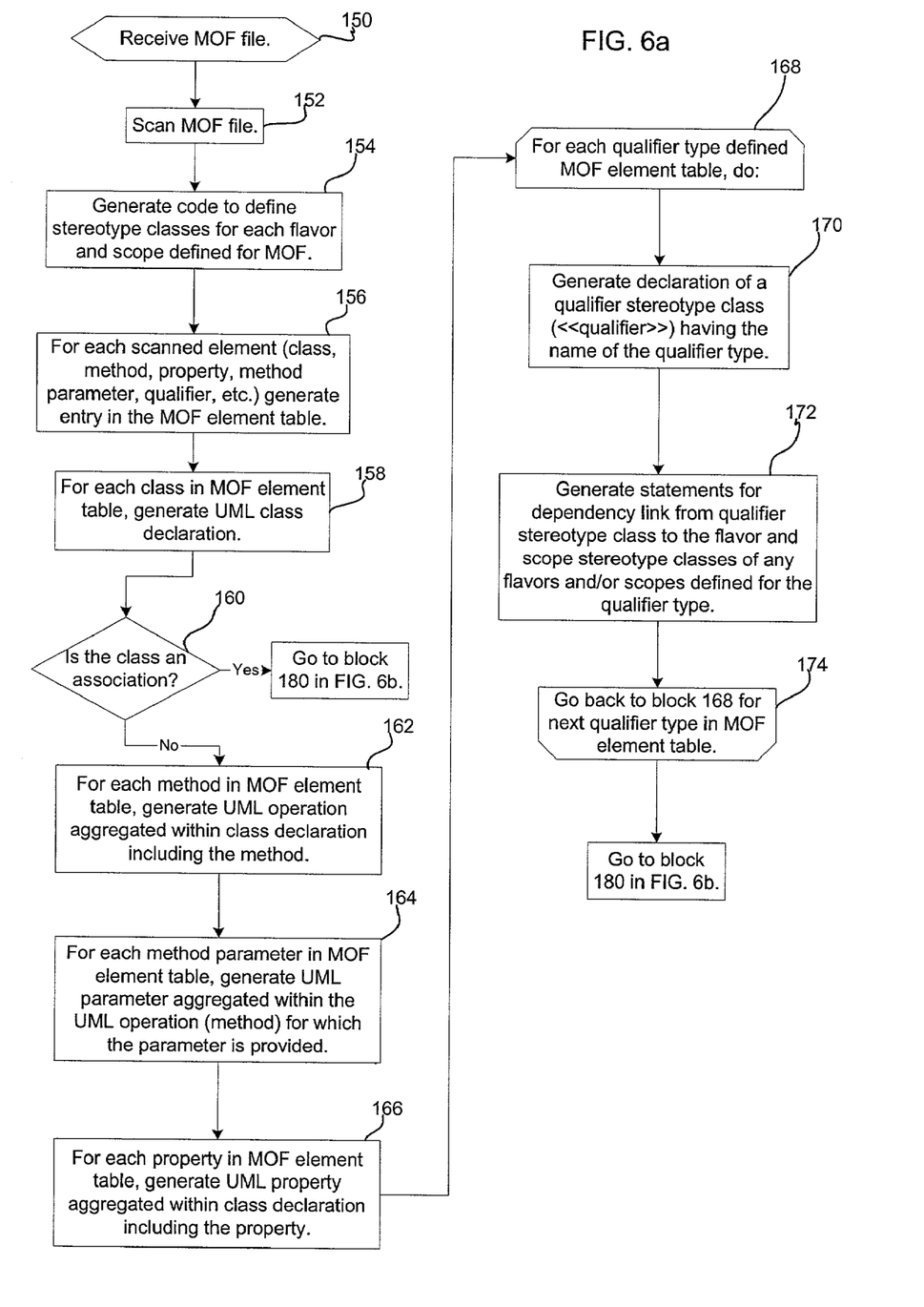
FIGS. 6a and 6b illustrate logic to translate schema definitions in a source language in a source file to a target language in a manner that preserves the metadata defined within the source file.
Figure 6B:
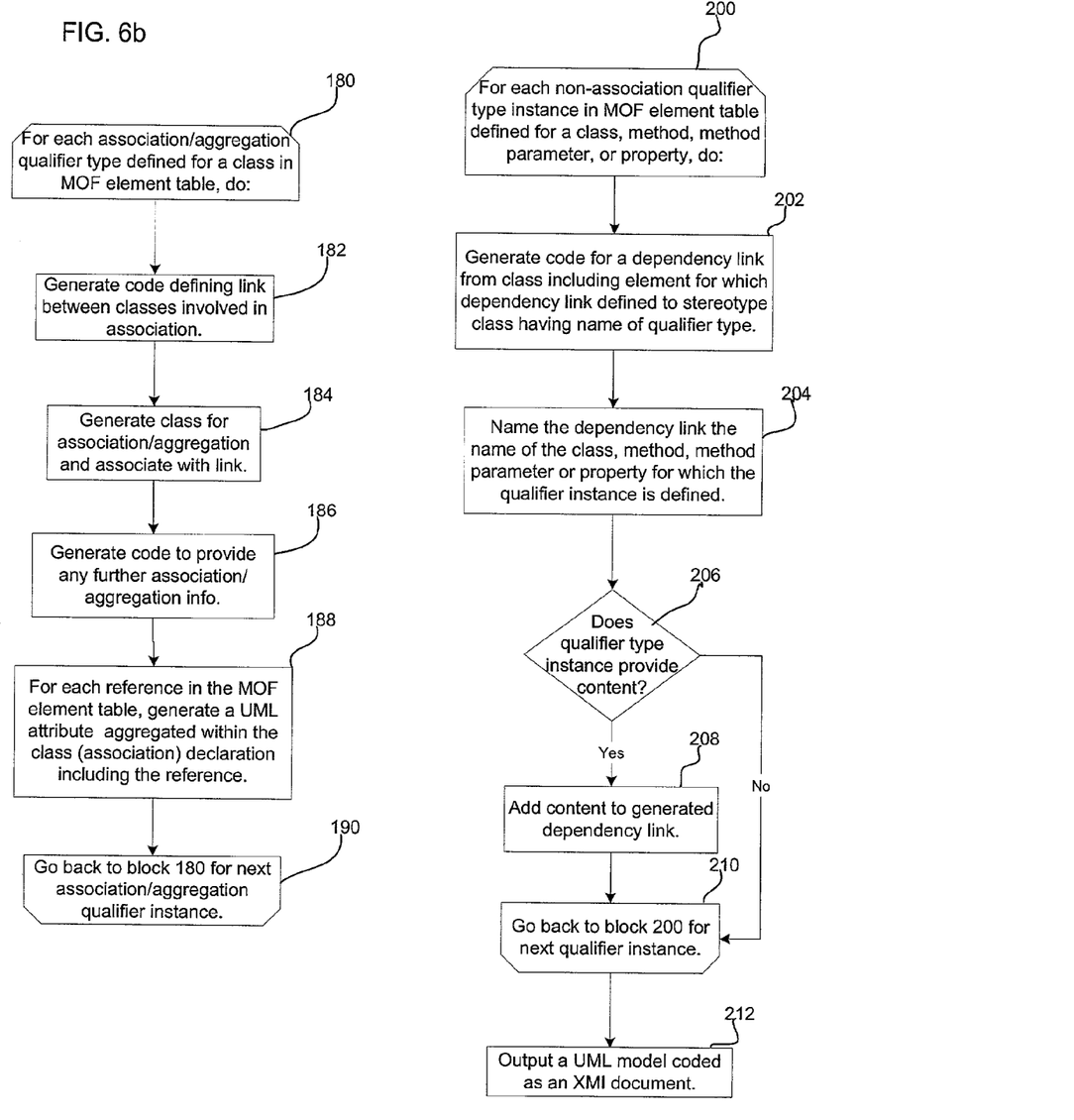

FIGS. 6a and 6b illustrate program logic implemented in the translator 6 to translate the MOF file 4 into code 18 implementing the UML structures, e.g., XMI coding. Control begins at block 150 upon receiving the MOF file 4. The translator 6 then scans (at block 152) the MOF file 4. At block 154, the translator 6 generates (at block 154) code to define stereotyped classes for each flavor 22a, 22b . . . 22e and scope 24a, 24b . . . 24j that will be referenced by the generated qualifier stereotyped classes 20 (FIG. 2). In certain implementations, the flavors, scopes and primitive types, such as shown in FIG. 2, may be pre-generated by the translator 6. Such elements constitute the metadata model. When the qualifier type is defined, the qualifier will reference existing flavors and scopes. A qualifier type is generated when declared. A class, property, method or parameter declaration references a qualifier type. The translator 6 further generates (at block 156) the MOF element table 16 including an entry for each scanned element, wherein an element comprises a separately declared class related entity in the MOF file 4, such as a declared class, qualifier, method, property, method parameter, association, etc. For each class in the MOF element table 16, the translator 6 generates (at block 158) a UML class declaration. Additional coding may apply. For instance, the presence of an abstract qualifier for the class in the MOF element table 16 may cause the setting of an abstract flag in the coding of the UML structure. If (at block 160) the class is an association, then control proceeds to block 180 in FIG. 6b. Otherwise, control proceeds to block 162 where, for each method entry in the MOF element table 16, the translator 6 generates statements to define the method as a UML operation within the class declaration including the method. The translator 6 will further generate (at block 164) statements to define the method parameters within the operation declaration, which is within the class declaration, and includes the method(s) using the method parameters. Similarly, for each property defined in the MOF element table 16, the translator 6 would generate (at block 166) statements to define the UML property within the class declaration for which the property is defined. In certain implementations, in processing the MOF element table 16, the translator 6 would generate UML code by class. Thus, when generating the declarations and other code for methods and parameters, such code would be generated for methods and parameters by class. The properties can be generated by class or association and a reference can be done by associations.

The translator 6 then performs a loop at blocks 168 through 174 for each qualifier type included in the MOF element table 16. The translator 6 generates (at block 170) a declaration of a qualifier stereotyped class (<<qualifier>>) having the name of the qualifier type, e.g., the name "Abstract" 30 shown in FIG. 2. The translator 6 further generates (at block 172) statements for the dependency links 26a . . . 26m and 28a . . . 28n (FIG. 2) from the qualifier stereotyped classes 20 to flavor 22a . . . 22e and/or scope 24a . . . 24j stereotyped classes corresponding to the flavors and scopes defined for the qualifier type in the MOF file 4 and MOF element table 16.

After generating all the qualifier stereotyped classes for MOF qualifier types and dependency links from the generated elements thereto, control proceeds to block 180 in FIG. 6b, where the translator 6 generates code 18 for the associations and aggregations defined in the MOF element table 16. A loop is performed at blocks 180 through 190 for each association and aggregation qualifier type defined for a class in the MOF element table 16. At block 182, the translator 6 generates code defining a link 102 (FIG. 4) between the classes 104 and 106 involved in the association/aggregation. A class 100 (FIG. 4) is then generated (at block 184) for the association or aggregation and any further code is generated (at block 186) to provide any further metadata information on the association with the class 100. The translator 6 further generates (at block 188), for each reference in the MOF element table, a UML attribute aggregated within the class (association) declaration including the reference.

At blocks 200 through 210, the translator 6 generates code to reference the qualifier metadata defined in the MOF file 4 for each qualifier instance in the MOF element table 16. The translator 6 generates (at block 202) code to implement a UML dependency link, e.g., links 54, 58, 70, 72, 74 (FIG. 3), from the class 50, 70 referencing the element to a qualifier stereotyped class, e.g., classes 20 (FIG. 2), 56 and 62 (FIG. 3) having the name of the qualifier type. The dependency link is then named (at block 202) the name of the class, method, method parameter or property for which the qualifier instance is defined. In certain implementations, the name would specify the type of element to which the dependency applies, such as a method parameter, method, class, property, etc. For instance, a method parameter name 74 (FIG. 3) may include both method and parameter name components to indicate that the element to which the qualifier type applies is a parameter of a method. If (at block 206) the qualifier instance in the MOF element table 16 being processed provides content information, such as the case with a description qualifier 62 (FIG. 3) that provides a text description as the element qualifier, then the translator 6 adds (at block 208) the associated content to the dependency link 54, 58, 70, 72, 74. At block 210, control returns to block 200 to consider any further qualifier instance entries in the MOF element table 18.

After generating code 18 to implement the elements in the MOF file 4 included in the MOF element table 16 as UML structures, the code is generated as output (at block 212) in a file, such as an XMI file. Additionally, the output may be rendered in a graphical user interface (GUI) of a UML modeling tool 10 in a manner known in the art. With the described implementations, the MOF class elements including metadata in MOF qualifiers are coded into a UML model 12 that may be used with UML modeling tools 10 in a manner that preservers the metadata in the UML model 12.

ADDITIONAL IMPLEMENTATION DETAILS

The above described method, apparatus or article of manufacture for translating schemas use standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which the described aspects of the invention are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the logic of FIGS. 6a and 6b, links to qualifiers are generated before the qualifier stereotyped classes are generated. In alternative implementations, the stereotyped classes for the scope, flavor and qualifiers may be generated prior to generating links from the class elements to the qualifier stereotyped classes.

The described implementations provide techniques for translating files using the MOF language to UML structures compatible with UML modeling tools 10 known in the art. However, those skilled in the art will appreciate that the mapping techniques described herein can apply to any other object oriented language translations when a source language provides metadata data structures that are not directly available in the target language. With the described implementations, metadata is mapped to the target language by generating specialized metadata classes to represent the metadata and associate such metadata specialized classes with the implementation of the class elements in the target language.

In the described implementations, each metadata or qualifier instance is associated with scope or flavor stereotyped classes that provide further attributes on the qualifier stereotyped class. Additionally, the qualifier classes may be associated with additional attributes and values implemented as special metadata classes, such as UML stereotyped classes.

The described implementations provided techniques for generating target code for specific elements in the target language, such as the class, method, property, association, and accompanying metadata. The described translation operations may apply to other MOF elements not discussed herein, such as references, indicators, triggers, indication, MOF compiler directives, MOF comments, etc., when metadata needs to be provided from the source file to the target coding of the structures. In extending the described implementations to other element types, a dependency link may be provided from the element type to the class structures generated to hold the qualifier metadata, such as the UML qualifier stereotyped classes.

FIGS. 6a and 6b described specific operations occurring in a specific order. However, those skilled in the art will appreciate that the logic described with respect to FIGS. 6a and 6b may be modified in that steps may be added, consolidated or modified. Further operations described as being performed sequentially may, in certain instances, be performed in parallel. Yet further, certain of the described operations may be executed by a single processing unit or by distributed processing units.

Figure 7:
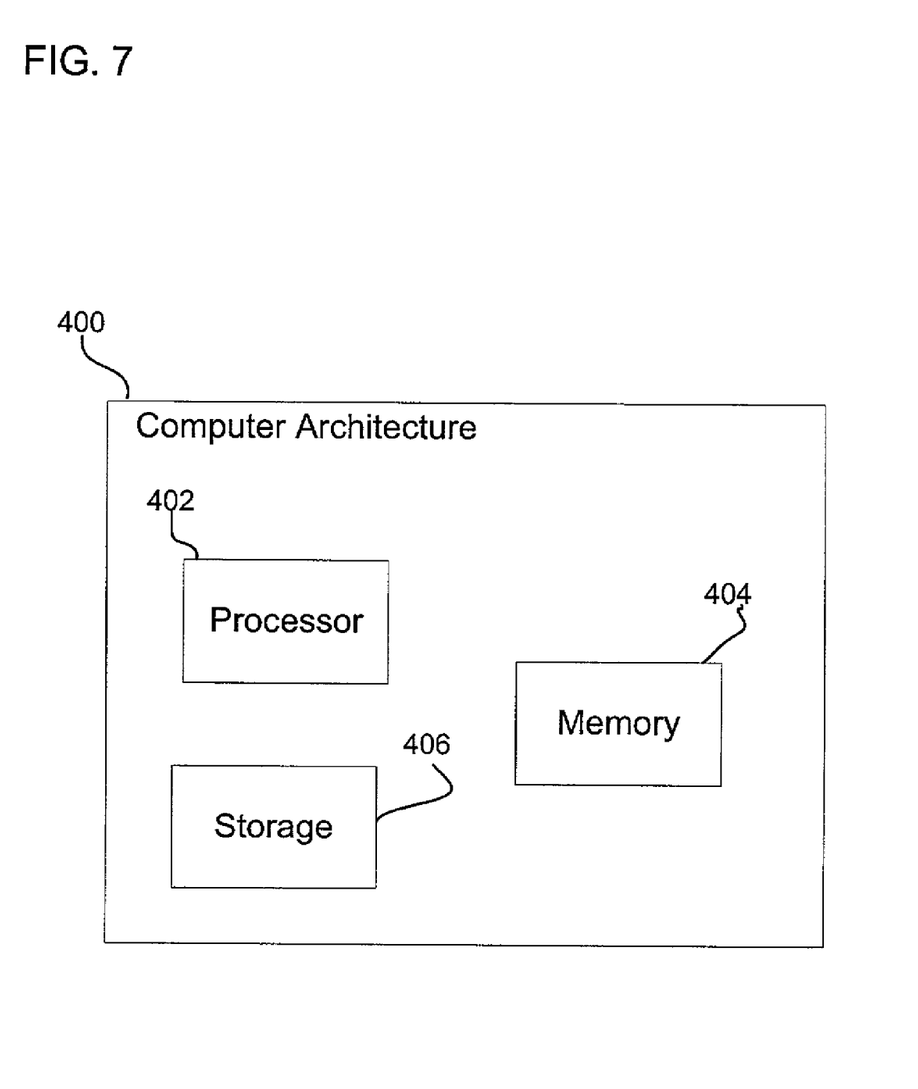
FIG. 7 illustrates one implementation of a computer architecture in which the computing environment of FIG. 1 may be implemented.

FIG. 7 illustrates one implementation of the architecture of the computer system 2 in FIG. 1. The computer system 2 may implement a computer architecture 400 having a processor 402 (e.g., a microprocessor), a memory 404 (e.g., a volatile memory device), and storage 406 (e.g., a non-volatile storage, such as magnetic disk drives, optical disk drives, a tape drive, etc.). The storage 406 may comprise an internal storage device or an attached or network accessible storage. Programs, such as the translator 6 and UML modeling tool 10, may be maintained in the storage 406 and loaded into the memory 404. The processor 402 may then execute the programs 6 and 10 to process files, e.g., files 4, 8, and 12, where the files may also be loaded from storage 406 into the memory 404 for processing.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for translating a class schema defining a first model in a managed object format language to a second model defined in a unified modeling language, comprising:

receiving class element definitions in a source file defining the first model in the manage object format language, which class element definitions define instances of qualifiers providing metadata for the class element;

generating at least one statement in the unified modeling language as part of the second model to implement class elements defined in the source file;

generating statements in the unified modeling language to define metadata elements for metadata types; and for each qualifier instance defined with one class element in the source file, generating statements in the unified modeling language to associate a metadata element generated for a qualifier with an implementation of the one class element so that qualifiers in the first model are represented as classes with associated metadata in the second model.

2. The method of claim 1, wherein the metadata elements comprise class elements in the unified modeling language.

3. The method of claim 1, wherein the metadata element is implemented as a stereotyped class.

4. The method of claim 1, further comprising:

generating statements to provide content with the association of the metadata element and the implementation of the class element in the unified modeling language when the instance for the class element in the source file provides content.

5. The method of claim 4, wherein the metadata elements comprise class elements in the unified modeling language, wherein the metadata element is implemented as a stereotyped class, wherein the association of the metadata elements to the implementation of the class elements comprises dependency links, and wherein the content provided with the qualifier instance for the class element is included with the dependency link.

6. The method of claim 1, wherein the class element definitions in the source file are for classes, methods, properties, and method parameters.

7. The method of claim 6, wherein the source file defines qualifier instances for classes, method, properties, and method parameters, and wherein the association of the metadata element with the implementation of the one class element in the unified modeling language associates the metadata element with the implementation of the class including the class, method, property, and method parameter defined with the qualifier in the source file.

8. The method of claim 7, further comprising:

defining a name for the association of a metadata element with the implementation of the one class element in the unified modeling language to indicate the class, method, property or method parameter to which the instance of the qualifier in the source file is defined.

9. The method of claim 1, wherein generating the statements to define metadata elements for qualifiers further comprises:

generating statements in the unified modeling language to define attribute elements for attributes defined with the qualifiers in the source file; and for each qualifier in the source file defined with attributes, generating statements in the unified modeling language to associate the metadata element generated for the qualifier with the attribute elements corresponding to the attributes defined for the qualifier in the source file.

10. The method of claim 9, wherein the attributes comprise scope and flavor for the qualifier.

11. The method of claim 1, wherein the metadata elements and attribute elements comprise class elements in the unified modeling language.

12. The method of claim 11, wherein the the metadata elements and attribute elements are implemented as stereotyped classes, and wherein the association of the attribute elements to metadata elements comprises dependency links.

13. The method of claim 1, wherein the instance of the source file defines an association between two classes, further comprising:

generating statements in the unified modeling language defining a link between the implementations of the two classes.

14. The method of claim 13, further comprising:

generating an association metadata element including information on the association between two classes provided with the qualifier instance; and associating the generated metadata element with the link.

15. The method of claim 1, wherein the generated statements in the unified modeling language are stored in a target file, further comprising:

importing the target file to a modeling tool; and rendering, with the modeling tool, a graphical representation of the schema implemented in the target file.

16. The method of claim 15, wherein the unified modeling file comprises an XMI file implementing the source file as a UML model, and wherein the modeling tool presents a graphical representation of a UML schema.

17. A system for use in a computer having a memory, the system translating a source file stored in the memory as a class schema defining a first model in a managed object format language to a target file stored in the memory in a unified modeling language defining a second model that allows the target file to be manipulated by existing software tools, and comprising:

means for receiving class element definitions in the source file defining the first model in the manage object format language, which class element definitions define instances of qualifiers providing metadata for the class elements;

means for generating at least one statement in the unified modeling language as part of the second model to implement class elements defined in the source file;

means for generating statements in the unified modeling language to define metadata elements for qualifiers; and means for generating statements in the unified modeling language, for each qualifier instance defined with one class element in the source file, to associate the metadata element generated for the qualifier with the implementation of the class element so that qualifiers in the first model are represented as classes with associated metadata in the second model.

18. The system of claim 17, wherein the metadata elements comprise class elements in the unified modeling language.

19. The system of claim 17, further comprising:

means for generating statements to provide content with the association of the metadata element and the implementation of the class element in the unified modeling language when the qualifier instance for the class element in the source file provides content.

20. The system of claim 17, wherein the class element definitions in the source file are for classes, methods, properties, and method parameters, and wherein the source file defines instances of qualifier for classes, method, properties, and method parameters, and wherein an association of the metadata element with the implementation of one class element in the target language associates the metadata element with the implementation of the class element including the class, method, property, and method parameter defined with the qualifier in the source file.

21. The system of claim 17, wherein statements are generated in the unified modeling language to define attribute elements for attributes defined with the qualifiers in the source file, wherein the metadata elements and attribute elements comprise class elements in the unified modeling language; wherein the metadata elements and attribute elements are implemented as stereotyped classes, and wherein an association of the attribute elements to metadata elements comprises dependency links.

22. A system for translating a class schema defining a first model in a manage object format language to a unified modeling language defining a second model, comprising:
 a storage device including a source file in the managed object format language, wherein the definitions of the class elements that form part of the first model define instances of qualifiers providing metadata for the class elements;
 a processing unit configured to perform:
  (i) receiving class element definitions in the source file;
  (ii) generating statements that form part of the second model in the unified modeling language to implement class elements defined in the source file;
  (iii) generating statements in the unified modeling language to define metadata elements for qualifiers; and
  (iv) generating statements in the unified modeling language, for each qualifier instance defined with one class element in the source file, to associate the metadata element generated for the qualifier with an implementation of one class element so that qualifiers in the first model are represented as classes with associated metadata in the second model.

23. The system of claim 22, wherein the metadata elements comprise class elements in the unified modeling language.

24. The system of claim 22, wherein the processing unit executes the code to further perform:
 generating statements to provide content with the association of the metadata element and the implementation of the class element in the unified modeling language when the qualifier instance for the class element in the source file provides content.

25. The system of claim 22, wherein the class element definitions in the source file are for classes, methods, properties, and method parameters, and wherein the source file defines instances of qualifiers for classes, method, properties, and method parameters, and wherein the association of the metadata element with the implementation of one class element in the unified modeling language associates the metadata element with the implementation of the class including the class, method, property, and method parameter defined with the qualifier in the source file.

26. The system of claim 22, wherein statements are generated in the unified modeling language to define attribute elements for attributes defined whit the qualifier in the source file, wherein the metadata elements and attribute elements comprise class elements in the unified modeling language; wherein the metadata elements and attribute elements are implemented as stereotyped classes, and wherein an association of the attribute elements to metadata elements comprises dependency links.

27. An article of manufacture configured to translate a source file stored in a memory of a computer as a class schema defining a first model in a managed object format language to a target file in the memory in a unified modeling language defining a second model, the article of manufacture comprising a computer usable storage medium having computer readable program code thereon which, when executed by a processor, causes operations to be performed, the operations comprising:
 receiving class element definitions that are part of the first model in a source file in the managed object format language, which class element definitions define instances of qualifiers providing metadata for the class elements;
 generating statements in the unified modeling language that are part of the second model to implement class elements defined in the source file;
 generating statements in the unified modeling language to define metadata elements for qualifiers; and
 for each metadata data type instance defined with one class element in the source file, generating statements in the unified modeling language to associate a metadata element generated for the qualifier with the implementation of one class element so that qualifiers in the first model are represented as classes with associated metadata in the second model.

28. The article of manufacture of claim 27, wherein the metadata elements comprise class elements in the unified modeling language.

29. The article of manufacture of claim 27, wherein the metadata element is implemented as a stereotyped class.

30. The article of manufacture of claim 27, further comprising:
 generating statements to provide content with the association of the metadata element and the implementation of the class element in the unified modeling language when the qualifier instance for the class element in the source file provides content.

31. The article of manufacture of claim 30, wherein the metadata elements comprise class elements in the unified modeling language, wherein the metadata element is implemented as a stereotyped class, wherein the association of the metadata elements to the implementation of the class elements comprises dependency links, and wherein the content provided with the qualifier instance for the class element is included with the dependency link.

32. The article of manufacture of claim 27, wherein the class element definitions in the source file are for classes, methods, properties, and method parameters.

33. The article of manufacture of claim 27, wherein the source file defines qualifier instances for classes, method, properties, and method parameters, and wherein the association of the metadata element with an implementation of one class element in the unified modeling language associates the metadata element with the implementation of one class element including the class, method, property, and method parameter defined with the metadata type in the source file.

34. The article of manufacture of claim 33, further comprising:
 defining a name for the association in the metadata element with the implementation of the one class element in the unified modeling language to indicate the class, method, property or method parameter to which the instance of the qualifier in the source file is defined.

35. The article of manufacture of claim 27, wherein generating the statements to define metadata elements for qualifiers further comprises:

generating statements in the unified modeling language to define attribute elements for attributes defined with the qualifier in the source file; and for each qualifier in the source file defined with attributes, generating statements in the unified modeling language to associate the metadata element generated for the qualifier with the attribute elements corresponding to the attributes defined for the metadata type in the source file.

36. The article of manufacture of claim 27, wherein the attributes comprise scope and flavor for the qualifiers.

37. The article of manufacture of claim 27, wherein the metadata elements and attribute elements comprise class elements in the unified modeling language.

38. The article of manufacture of claim 37, wherein the metadata elements and attribute elements are implemented as stereotyped classes, and wherein the association of the attribute elements to metadata elements comprises dependency links.

39. The article of manufacture of claim 27, wherein the qualifier instance in the source file defines an association between two classes, further comprising:

generating statements in the unified modeling language defining a link between the implementations of the associated classes.

40. The article of manufacture of claim 39, further comprising:

generating an association metadata element including information on the association between two classes provided with the qualifier instance of the; and associating the generated metadata element with the link.

41. The article of manufacture of claim 27, wherein the generated statements in the unified language are stored in a target file, further comprising:

importing the target file to a modeling tool; and rendering, with the modeling tool, a graphical representation of a schema implemented in the target file.

42. The article of manufacture of claim 41, wherein the target file comprises an XMI file implementing the source file as a UML model, and wherein the modeling tool presents a graphical representation of a UML schema.

* * * * *

UNITED STATES PATENT AND TRADEMARK OFFICE
CERTIFICATE OF CORRECTION

| | |
|---|---|
| PATENT NO. | : 7,174,533 B2 |
| APPLICATION NO. | : 10/098945 |
| DATED | : February 6, 2007 |
| INVENTOR(S) | : Jordan T. Boucher |

It is certified that error appears in the above-identified patent and that said Letters Patent is hereby corrected as shown below:

In column 11, at line 2, delete "manage" and insert --managed--.

In column 11, at line 4, delete "element" and insert --elements--.

In column 11, at line 9, delete "metadata types" and insert --qualifiers--.

In column 11, at line 25, before "instance", insert --qualifier--.

In column 11, at line 43, before "class", insert --one--.

In column 11, at line 43, after "class", insert --element--.

In column 11, at line 47, delete "the" and insert --an--.

In column 12, at line 5, before "instance", insert --qualifier--.

In column 12, at line 5, after "instance", delete "of" and insert --in--.

In column 12, at line 21, after "of", delete "the" and insert --a--.

In column 12, at line 22, delete "unified modeling" and insert --target--.

In column 12, at line 48, before "class", insert --one--.

In column 12, at line 67, before "class", insert --one--.

In column 13, at line 49, delete "the" and insert --an--.

In column 13, at line 50, after "of", insert --the--.

In column 13, at line 52, before "class", insert --one--.

In column 13, at line 53, before "including", insert --element--.

In column 13, at line 57, delete "whit" and insert --with--.

In column 13, at line 57, delete "qualifier" and insert --qualifiers--.

In column 13, at line 60, after "language", delete ";" and insert --,--.

In column 14, at line 16, delete "metadata data type" and insert --qualifier--.

UNITED STATES PATENT AND TRADEMARK OFFICE
CERTIFICATE OF CORRECTION

PATENT NO. : 7,174,533 B2
APPLICATION NO. : 10/098945
DATED : February 6, 2007
INVENTOR(S) : Jordan T. Boucher It is certified that error appears in the above-identified patent and that said Letters Patent is hereby corrected as shown below:

In column 14, at line 49, delete "method" and insert --methods--.

In column 14, at line 51, after "implementation of", insert --the--.

In column 14, at line 55, delete "metadata type" and insert --qualifier--.

In column 15, at line 8, delete "metadata type" and insert --qualifier--.

In column 16, at line 3, delete "associated" and insert --two--.

In column 16, at line 11, before "language", insert --modeling--.

Signed and Sealed this

Fifteenth Day of May, 2007

JON W. DUDAS
*Director of the United States Patent and Trademark Office*